(12) United States Patent
Stanik et al.

(10) Patent No.: US 8,485,594 B2
(45) Date of Patent: Jul. 16, 2013

(54) SILLBOARD ARRANGEMENT OF A MOTOR VEHICLE BODY

(75) Inventors: Stefan Stanik, Bruchkoebel (DE); Roland Lessmeister, Otterberg (DE); Bernd Pohl, Muenster-Sarnsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 9 days.

(21) Appl. No.: 13/274,704

(22) Filed: Oct. 17, 2011

(65) Prior Publication Data
US 2012/0091761 A1 Apr. 19, 2012

(30) Foreign Application Priority Data

Oct. 19, 2010 (DE) .......................... 10 2010 048 852

(51) Int. Cl.
*B60N 99/00* (2006.01)
(52) U.S. Cl.
USPC ........................................................ 296/209
(58) Field of Classification Search
USPC ............................................. 296/29, 30, 209
See application file for complete search history.

(56) References Cited

U.S. PATENT DOCUMENTS

| | | | |
|---|---|---|---|
| 6,325,451 | B1 | 12/2001 | Sikorski |
| 8,113,572 | B2 * | 2/2012 | Mildner et al. ............... 296/209 |
| 2006/0066139 | A1 | 3/2006 | Futatsuhashi |
| 2010/0140981 | A1 | 6/2010 | Mildner et al. |

FOREIGN PATENT DOCUMENTS

| | | |
|---|---|---|
| DE | 19901070 C1 | 6/2000 |
| DE | 10314972 A1 | 10/2004 |
| DE | 102004044037 A1 | 3/2006 |
| DE | 102008056507 A1 | 5/2010 |
| EP | 1375255 A2 | 1/2004 |
| JP | 2010012886 A | 1/2010 |

OTHER PUBLICATIONS

German Patent Office, German Search Report for Application No. 102010048852.6, dated Jul. 7, 2011.
UK Intellectual Property Office, British Search Report dated Jan. 13, 2012 for GB Application No. 1115980.3.

* cited by examiner

*Primary Examiner* — Lori Lyjak
(74) *Attorney, Agent, or Firm* — Ingrassia Fisher & Lorenz, P.C.

(57) ABSTRACT

A sillboard arrangement of a motor vehicle body is provided with a sillboard outside panel, a sillboard inside panel and a lateral wall outside panel. The sillboard inside panel and sillboard outside panel are joined together by at least one connecting flange hat extends in the longitudinal direction of the sillboard, and the lateral wall outside panel is attached to a bottom side of the sillboard outside panel in an area spaced apart from the connecting flange. The lateral wall outside panel can have secured to it an end cap, which at an end lying in the longitudinal direction of the sillboard profile exhibits a floor section that is essentially indentation free in relation to the transverse direction of the vehicle and spaced apart in the vertical direction of the vehicle from a bottom side of the lateral wall outside panel.

10 Claims, 8 Drawing Sheets

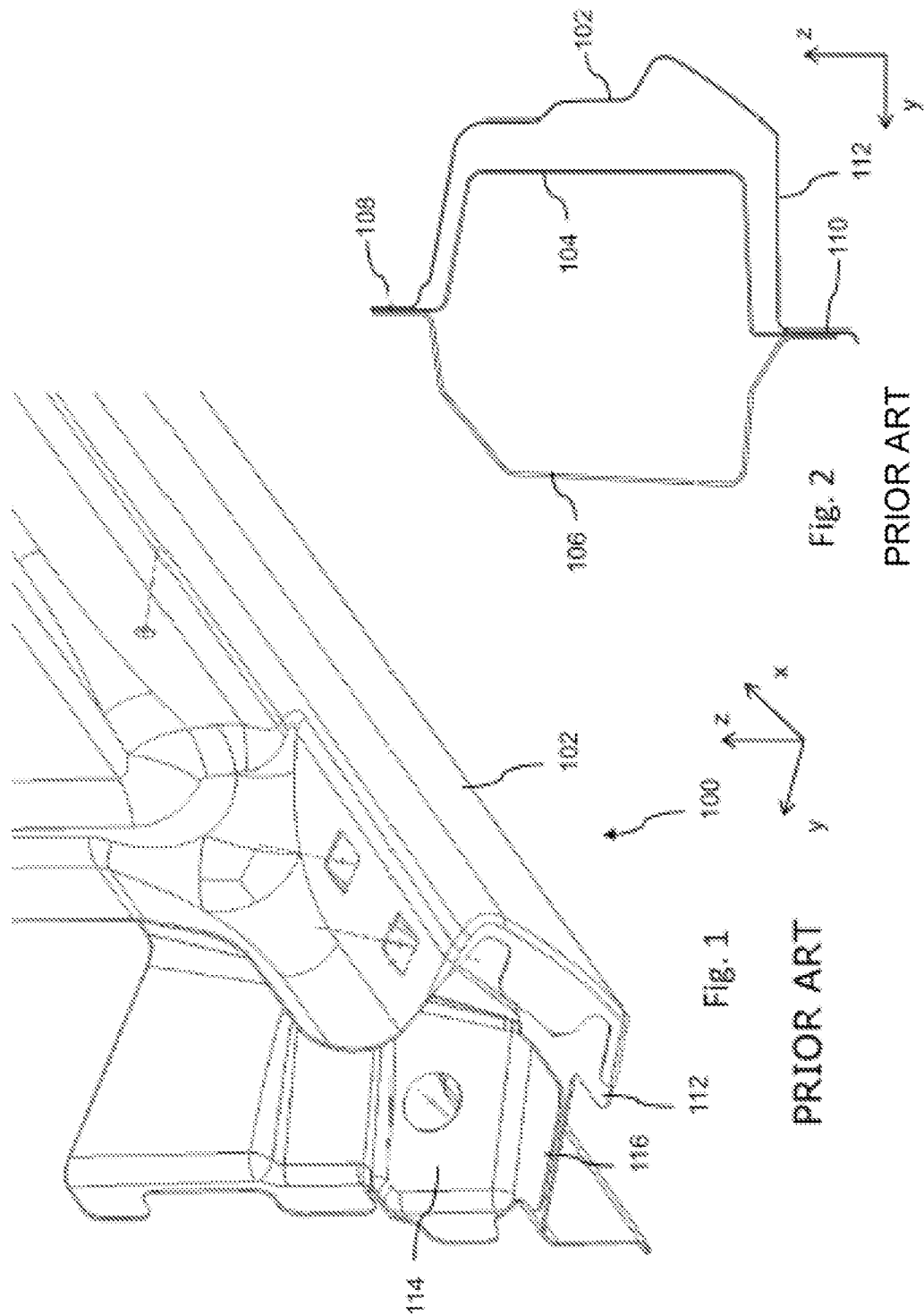

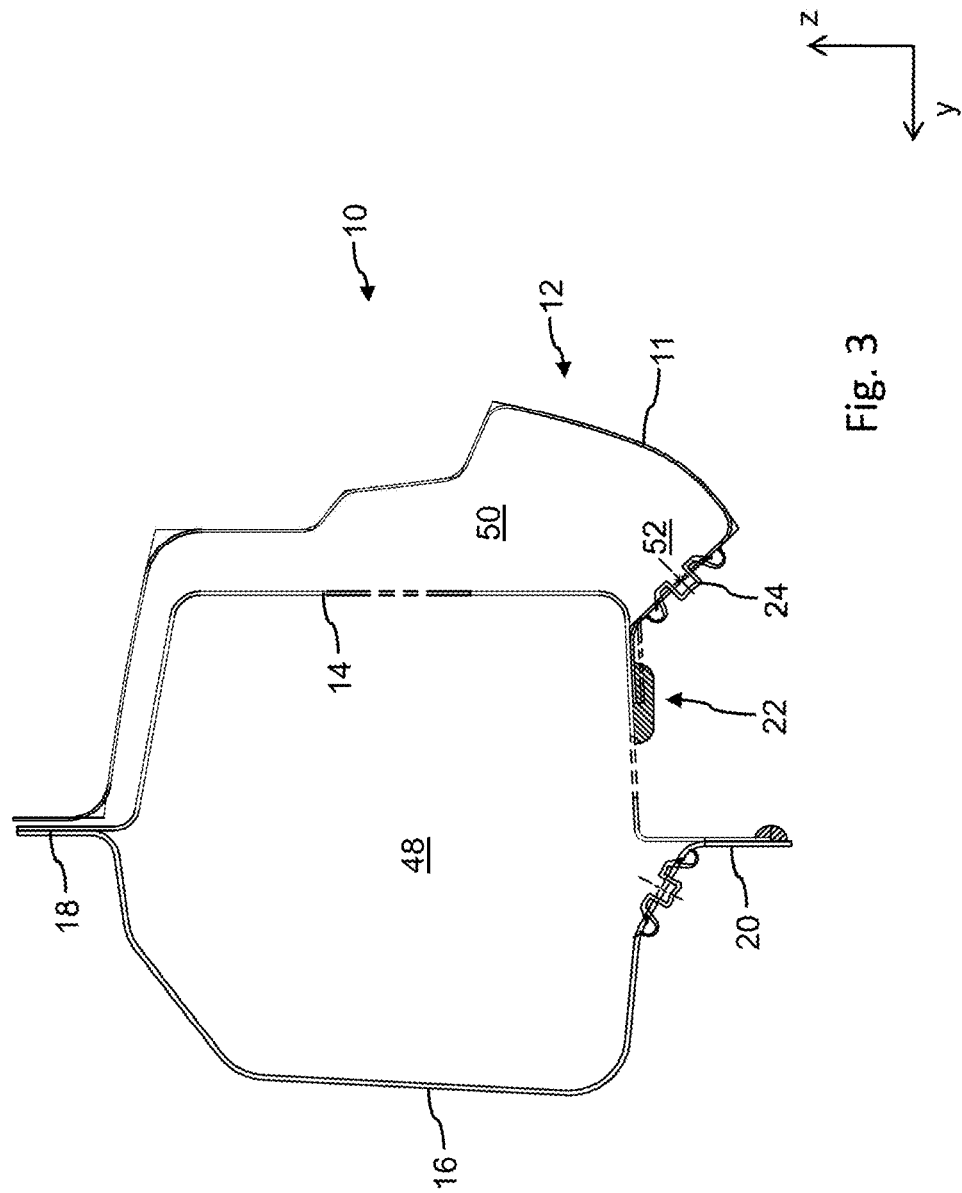

B-B

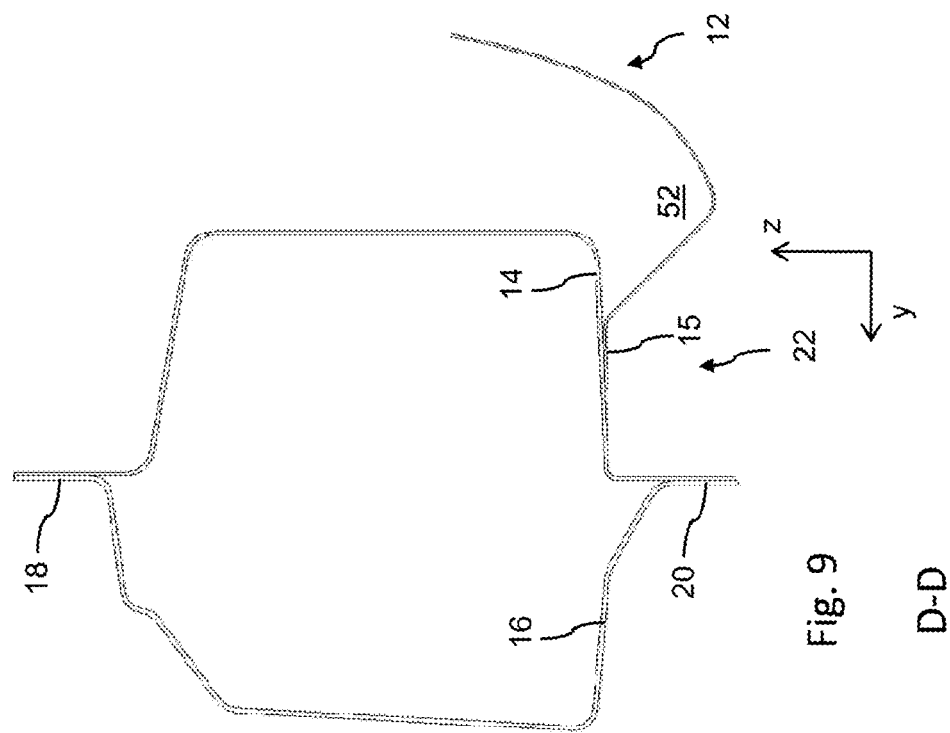
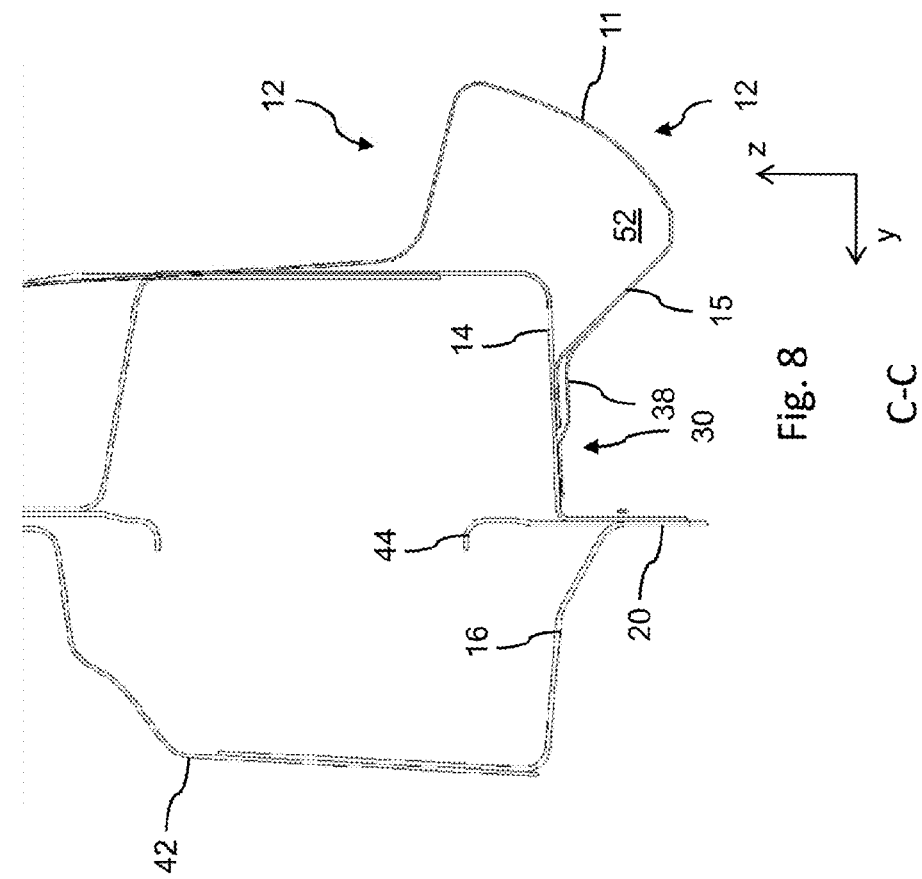

SILLBOARD ARRANGEMENT OF A MOTOR VEHICLE BODY

CROSS-REFERENCE TO RELATED APPLICATION

This application claims priority to German Patent Application No. 102010048852.6, filed Oct. 19, 2010, which is incorporated herein by reference in its entirety.

TECHNICAL FIELD

The technical field relates to a sillboard arrangement of a motor vehicle body, which exhibits at least a sillboard outside panel, a sillboard inside panel, as well as a lateral wall outside panel. The sillboard inside panel and sillboard outside panel are joined together by at least one connecting flange that extends in the longitudinal direction of the sillboard.

BACKGROUND

In order to reduce fuel consumption and concomitantly minimize gas emissions during the operation of motor vehicles, it is desirable to steadily minimize the vehicle weight. In addition to using lightweight building materials, reducing the size and part numbers of individual body components is most certainly a factor in achieving this purpose in vehicle body construction.

FIGS. 1 and 2 show a known sillboard arrangement 100. The cross section on FIG. 2 reveals a sillboard inside panel 106 that together with a sillboard outside panel 104 forms a sillboard structure resembling a hollow profile, which is largely covered from outside by a lateral wall outside panel 102. The sillboard inside panel 106, sillboard outside panel 104 along with the lateral wall outside panel 102 are here joined together at a shared jointing site 108, 110 respectively comprised of a connecting flange of the involved components, typically by means of welding.

Viewed in the longitudinal direction of the vehicle (x), the lateral wall outside panel 102 acting as a cladding section extends over the longitudinal end of the sillboard structure lying behind it, and adjacent to the jointing site 110 exhibits a floor section 112 that extends essentially in the transverse direction of the vehicle (y) and is shaped essentially flat. As fabrication of the motor vehicle body continues, this indentation-free floor section 112 serves as a receptacle for an end cap 114, which has already been pre-mounted to another body unit, for example the assembly of a reinforcing ring provided for the vehicle door.

During the modular assembly of the reinforcing ring and a lateral wall construct exhibiting the sillboard structure, the two body constructs must essentially be put together in the transverse direction of the vehicle (y). In the process, the end cap 114 provided with the lower attachment flange 116 is essentially moved in the transverse direction of the vehicle (y) in the view according to FIG. 2, from left to right along the inside of the floor section 112 of the lateral wall outer panel 102 into a final assembly position, in which the end cap can essentially seal the hollow profile comprised of the sillboard inside panel 106, sillboard outside panel 104 and lateral wall outside panel 102.

By contrast, at least one object is to provide an improved sillboard arrangement that enables a reduction in weight, material and costs, and can be implemented without changing the described joining and manufacturing process. In addition, other objects, desirable features and characteristics will become apparent from the subsequent summary and detailed description, and the appended claims, taken in conjunction with the accompanying drawings and this background.

SUMMARY

This sillboard arrangement of a motor vehicle body exhibits a sillboard outside panel, a sillboard inside panel, as well as a lateral wall outside panel. The sillboard inside panel and sillboard outside panel are here joined together by means of at least one connecting flange that essentially extends in the longitudinal direction of the sillboard. Both the sillboard inside panel and the sillboard outside panel are typically designed as shells, which exhibit connecting flanges that correspond with each other, against which the two panels alternately abut, forming a hollow profile. At least one of two conceivable connecting flanges, preferably the connecting flange lying at the bottom, is here not used to secure the lateral wall outside panel to the sillboard structure formed by the sillboard inside panel and sillboard outside panel.

Viewed in the transverse direction of the vehicle (y), the lateral wall outside panel has a shortened design to save on material, and is at least regionally attached directly to a bottom side of the sillboard outside panel spaced apart from the sillboard connecting flange. Since the vehicle design prescribes the outward appearance of the lateral wall outside panel, securing it to a bottom side of the sillboard outside panel causes an indentation to form in the transverse direction of the vehicle.

However, such an indented region, which initially runs downward proceeding from the connecting segment with the sillboard outside panel as viewed in the transverse direction of the vehicle, prevents a hollow profile of the lateral wall outside panel downwardly projecting from the sillboard bottom side from being sealed by means of a known end cap, which must absolutely be inserted along the transverse direction of the vehicle (y) in the profile cross section of the sillboard and/or lateral wall. Such being the case, the lateral wall outside panel can have attached to it an end cap, which at an end lying in the longitudinal direction of the sillboard profile exhibits a floor section that is essentially indentation free in relation to the transverse direction of the vehicle and spaced apart in the vertical direction of the vehicle from the bottom side of the lateral wall outside panel. At least the bottom side of the lateral wall outside panel to be joined with the bottom side of the sillboard outside panel is shortened by comparison to prior art, and at least the bottom side of the lateral wall outside panel is provided with a modified end cap, which in terms of its cross sectional geometry is adjusted to the modified shaping of the lateral wall outside panel, and which also can be inserted into the cross sectional profile formed by the lateral wall outside panel in the transverse direction of the vehicle.

In an embodiment, the end cap and lateral wall outside panel are designed in such a way that the end cap can be inserted into the profile of the lateral wall outside panel in a joining direction extending essentially in the transverse direction of the vehicle. Another embodiment further provides that the bottom side of the lateral wall outside panel exhibits a recess for accommodating the end cap. It is here provided in particular that the recess is formed in a region with which at least a lateral wall section of the lateral wall outside panel projects over an end section of the sillboard structure formed by the sillboard outside panel and sillboard inside panel in the longitudinal direction of the sillboard. A bottom side or floor section of the lateral wall outside panel can be designed to be shorter than the bottom side of a sillboard outside panel. However, a front wall of the end cap preferably arranged outside on the bottom side of the lateral wall outside panel extends beyond the longitudinal end of the sillboard structure, forming a terminal for the latter.

In a further embodiment, the end cap exhibits a lower connecting flange, which comes to lie against the bottom side of the lateral wall outside panel in the installed position. It is here further provided that the portion of the end cap adjoining the lower connecting flange exhibits an incline downwardly projecting in the longitudinal direction of the vehicle (x) and vertical direction of the vehicle (z), which passes over to the floor section of the end cap, which as is generally known comes to lie under the sillboard outside panel, spaced apart relative to the vertical direction of the vehicle. In this way, the end cap can form a downwardly projecting extension for the lateral wall outside panel, so that it can form a connecting and jointing site provided at the end of the sillboard for additional body components in the usual manner. In this regard, the end cap comprises a kind of transition profile between a conventional lateral wall outside panel profile and a lateral wall cross sectional profile with a shortened or tapered cross section.

Since the floor section of the end cap exhibits the lowermost site in the structure of the lateral wall as viewed in the vertical direction of the vehicle, a water outlet device is advantageously integrated into the floor section. The water outlet device is here preferably designed as a plastic or rubber stopper or valve, and makes it possible to discharge perspiration or condensation water formed in the hollow profile sections of the sillboard outside panel, sillboard inside panel and/or lateral wall outside panel.

In another embodiment, the end cap with a lateral connecting flange abuts the inside of a lateral profile section of the lateral wall outside panel. Such a reciprocal abutment position of the lateral profile sections of the lateral wall outside panel and end cap is especially advantageous with respect to assembling the lateral wall construct and the door/reinforcing ring construct.

In addition, it proves advantageous to design the lateral wall outside panel as a component fabricated by bending. For example, the latter can be fabricated via molding operations that involve bending by means of rounding, swiveling, and milling, folding or rolling techniques. Such a component fabricated by bending can advantageously be made more cost effectively than a conventional thermoformed component that has been used to date. In addition to saving on material, a more cost-effective manufacturing process can thus also be used in fabricating the lateral wall outside panel. By contrast, the end cap is to be designed as a cast or thermoformed component, if necessary also as an embossed component.

In another embodiment, the end cap is designed in such a way and to be secured to the sillboard arrangement in such a way as to lock a hollow profile comprised of a sillboard outside panel and sillboard inside panel in the longitudinal direction of the profile. In its end position, in which the reinforcing ring construct is joined with the lateral wall construct, the end cap belonging to the door/reinforcing ring construct acts as a frontal strike plate for the sillboard structure comprised of the sillboard outside panel and sillboard inside panel.

Another embodiment correspondingly provides that the end cap locks a hollow profile comprised of the sillboard outside panel and lateral wall outside panel upon reaching its final installation position. In this regard, the end cap exhibits one or more connecting flanges corresponding to the cross sectional geometry of the cavity to be closed, with which the respective end cap can be secured separately to the adjoining panel profile sections, e.g., on the sillboard outside panel, sillboard inside panel and/or lateral wall outside panel, preferably in a welding operation or with similar integral joining techniques.

In addition, other embodiments provide for a motor vehicle body or motor vehicle that exhibits at least one sillboard arrangement described above.

BRIEF DESCRIPTION OF THE FIGURES

The present invention will hereinafter be described in conjunction with the following drawing figures, wherein like numerals denote like elements, and:

FIG. 1 is a perspective view of a sillboard arrangement according to prior art;

FIG. 2 is a cross section through the arrangement according to FIG. 1;

FIG. 3 is a cross section through a sillboard arrangement according to an embodiment;

FIG. 8 is another cross section C-C according to FIG. 4;

FIG. 9 is another cross section along the intersecting line D-D according to FIG. 4.

DETAILED DESCRIPTION

Figure 4:
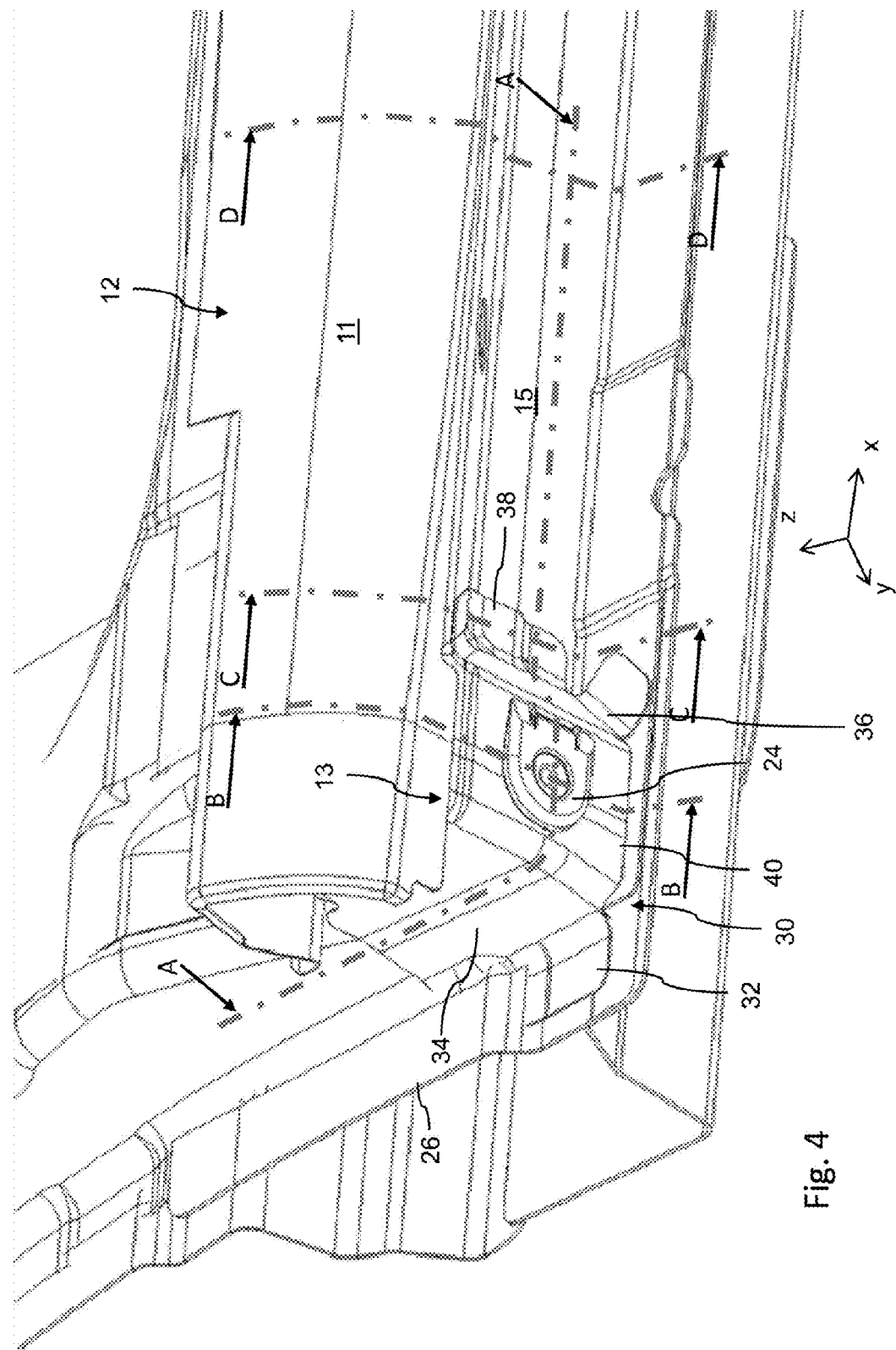
FIG. 4 is a perspective view of a sillboard arrangement belonging to FIG. 3.

The following detailed description is merely exemplary in nature and is not intended to limit application and uses. Furthermore, there is no intention to be bound by any theory presented in the preceding background or summary or the following detailed description.

The sillboard arrangement 10 as exemplarily shown in cross section on FIG. 3 exhibits a sillboard inside panel 16 and a sillboard outside panel 14, which as viewed in the vertical direction of the vehicle (z) each exhibit jointing sites 18, 20 top and bottom that resemble flanges, along which the two sillboard panels 14, 16 designed approximately like a top hat profile are joined together in the longitudinal direction of the sillboard (x).

A modified lateral wall outside panel 12 further extends over the exterior of the sillboard outside panel 14 visible on the right of FIG. 3, and also rests against the shared jointing site 18 with an upper flange section, but its lower end section is shortened by comparison to a known design shown on FIG. 2 so as to save on material and weight, so that it does not reach as far as the lower jointing site 20 in this respect, but instead directly borders an essentially horizontally aligned pedestal or floor section of the sillboard outside panel 14, forming a roughly V-shaped depression or indentation 52. The sillboard outside panel 14 and lateral wall outside panel 12 are advantageously welded together yielding the formation of a welded seam 22, wherein other non-positive or integral jointing techniques can also be used in place of a welded connection, such as screws, clinch rivets, and adhesives.

Figure 5:
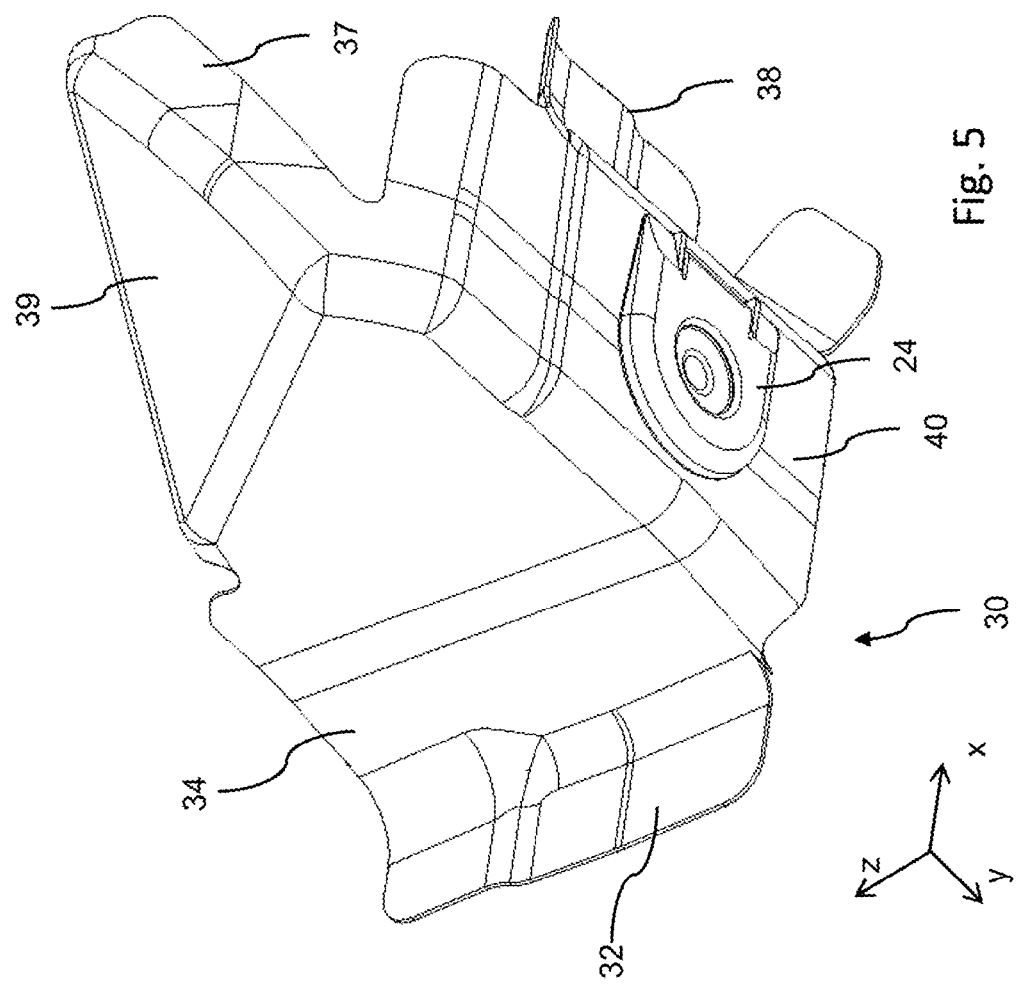
FIG. 5 is an isolated, perspective view of the end cap.

The hollow profile 48 formed by the sillboard outside panel 14 and sillboard inside panel 16 as well as the hollow profile 50 formed by the sillboard outside panel 14 and lateral wall outside panel 12 is frontally locked by means of an end cap 30, an isolated view of which is depicted on FIG. 5. The end cap 30 is part of a door/reinforcing ring construct, and only when this construct is assembled with the lateral wall construct exhibiting the sillboard arrangement is it typically brought into the final assembly position on the front side of the sillboard arrangement 10 provided for this purpose.

In this respect, the perspective depiction according to FIG. 4 provides a view of the already connected body modules, lateral wall construct and door/reinforcing ring construct at an inclination from below, wherein this perspective corresponds to the perspective according to FIG. 5, which shows the end cap 30 in an isolated view. The end cap 30 further abuts a hinged column 26 with a lateral flange 32 that borders its front side 34 and extends essentially in the longitudinal and vertical direction of the vehicle, and is preferably joined with it there.

In the view according to FIG. 4, the lateral wall outside panel 12 is shown with an external side 11 and a bottom side 15 that is shortened by comparison to prior art. According to the cross sectional views on FIG. 8 and FIG. 9, the bottom side 15 is bent relative to the horizontal, so that it proceeds from the bottom side of the sillboard outside panel 14 to form a depression or indentation 52 of the kind denoted on FIG. 3, FIG. 8 and FIG. 9.

By contrast, the floor section 15 of the lateral wall outside panel 12 is not extended up to the sillboard outside panel 14 in the transitional area toward the end cap 30. Instead, a recess 13 is provided in the bottom side 15 of the lateral wall outside panel, into which the end cap 30 is inserted. The end cap 30 exhibits a connecting flange 38, which is used to secure it to the bottom side 15 of the lateral wall outside panel 12 designed shorter in the longitudinal direction of the sillboard, and comes to lie externally on the bottom side 15 of the lateral wall outside panel 12, as may be gleaned from reviewing FIG. 4 and FIG. 8.

Figure 6:
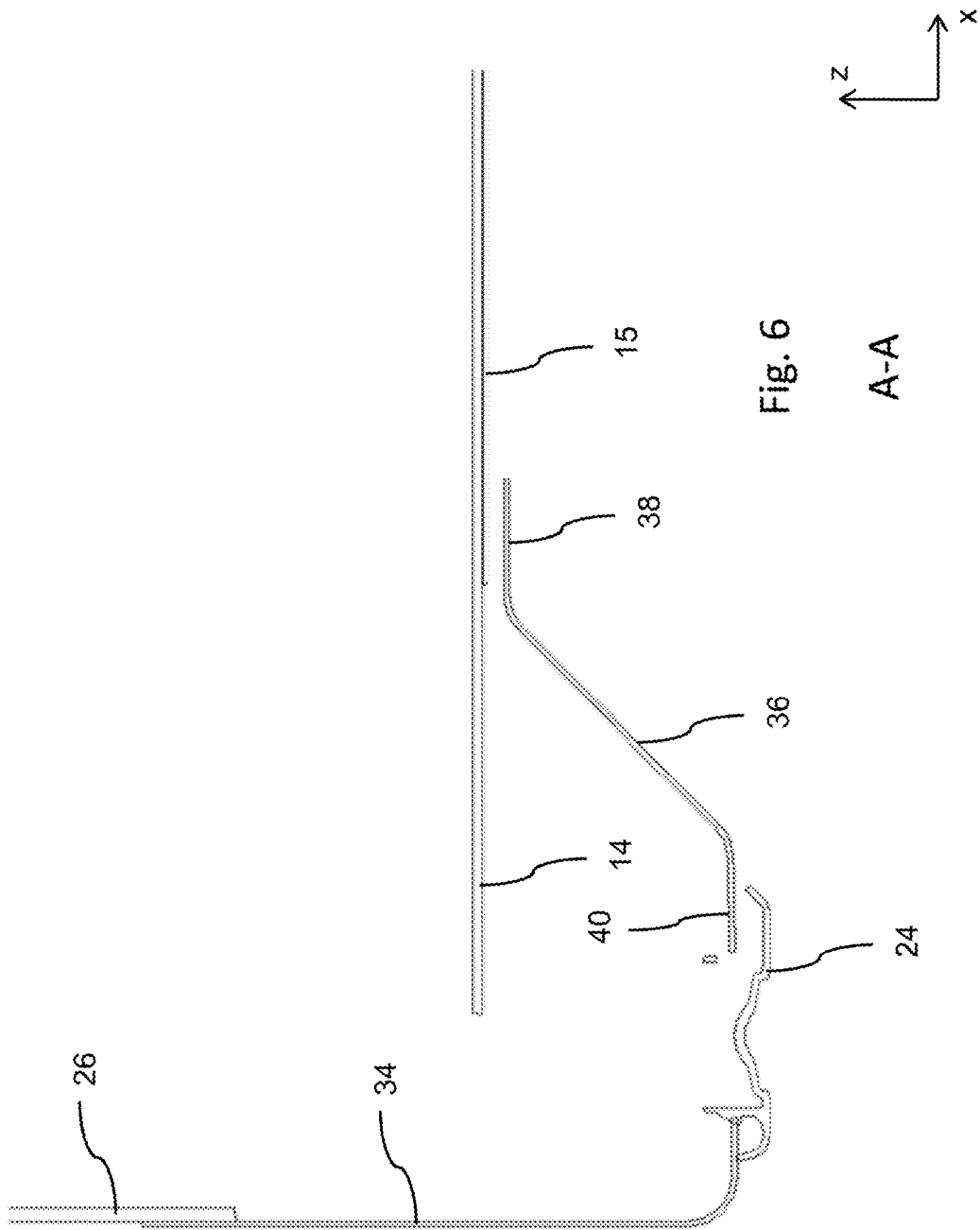
FIG. 6 is a cross section in the x-z plane along the cross section A-A according to FIG. 4.

Adjacent to this connecting flange 38, the end cap 30 passes over into a downwardly projecting incline 36 and further adjacent hereto into a floor section 40 extending essentially parallel to the longitudinal and transverse direction of the vehicle. Embedded into the floor section 40 is a water outlet valve 24, as shown on FIG. 5 to FIG. 7. The height level of the floor section 40 roughly corresponds to the former height level of the floor section 112 as reflected by the embodiment according to prior art shown on FIG. 2.

In this respect, the end cap 30 provides a height offset or adjustment for the shortened floor section 15 of the lateral wall outside panel 12 that upwardly borders the bottom side of the sillboard outside panel. As may further be gleaned from FIG. 6, the bottom side and floor side 15 of the lateral wall outside panel 12 is shortened in the longitudinal direction of the vehicle by comparison to the sillboard outside panel 14.

Figure 7:
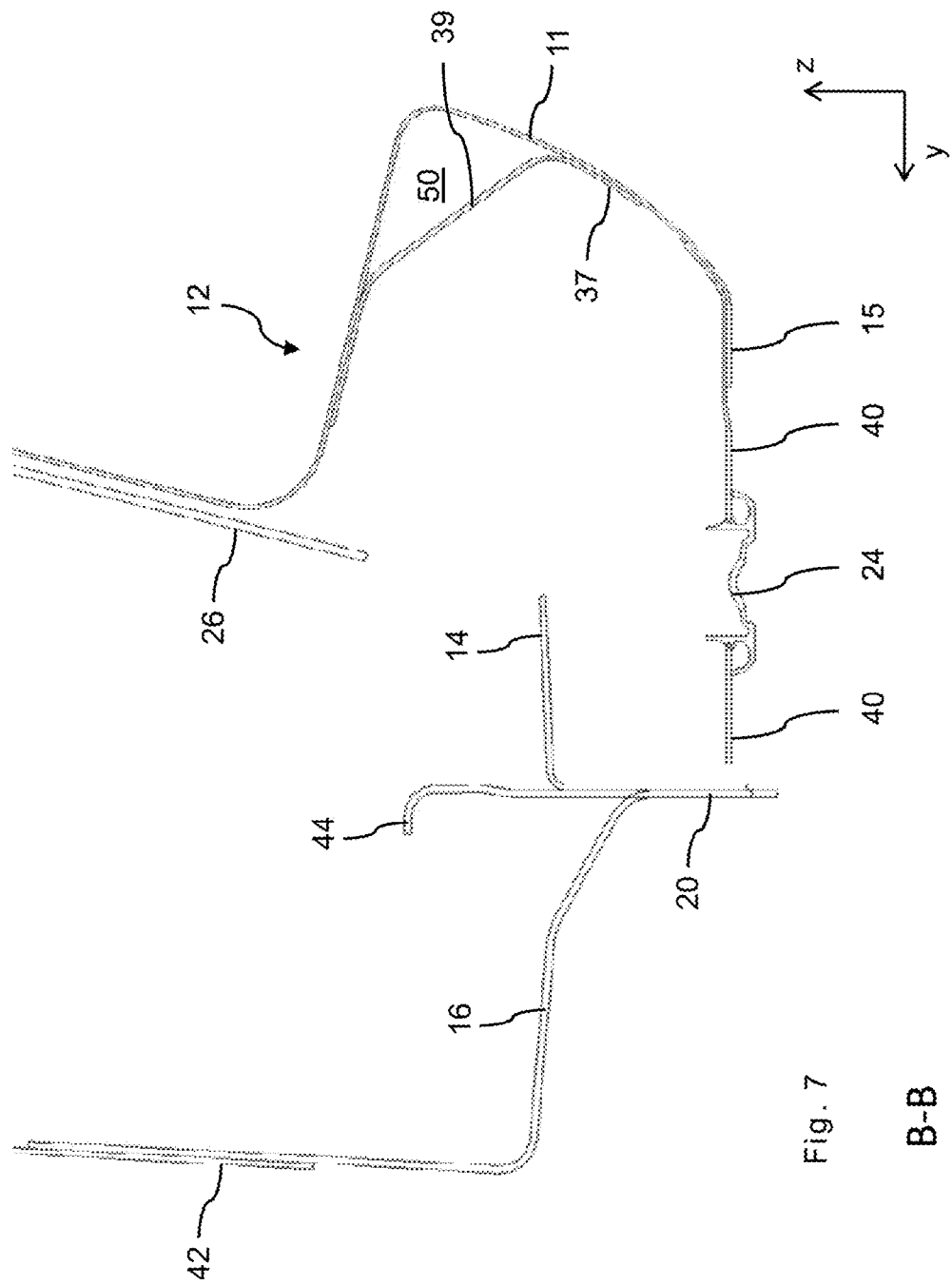
FIG. 7 is a cross section in the y-z plane B-B according to FIG. 4.

FIG. 7 further depicts the required vertical distance prescribed by the additional body components between the bottom side of the sillboard outside panel 14 and the floor section 40 of the end cap 30. Also visible in the depiction according to FIG. 7 is a reinforcing panel 44 arranged in the lower jointing site 20 of the sillboard outside panel 14 and sillboard inside panel 17, which is used to reinforce a jack receiving area. The sillboard inside panel 16 upwardly borders a lateral front wall 42 of the vehicle body, while in the cross section according to FIG. 7, an upwardly projecting flange section of the lateral wall outside panel 12 adjoins a hinged column 26 provided in extension of the A-column of the body, and is there joined thereto.

Figure 10:
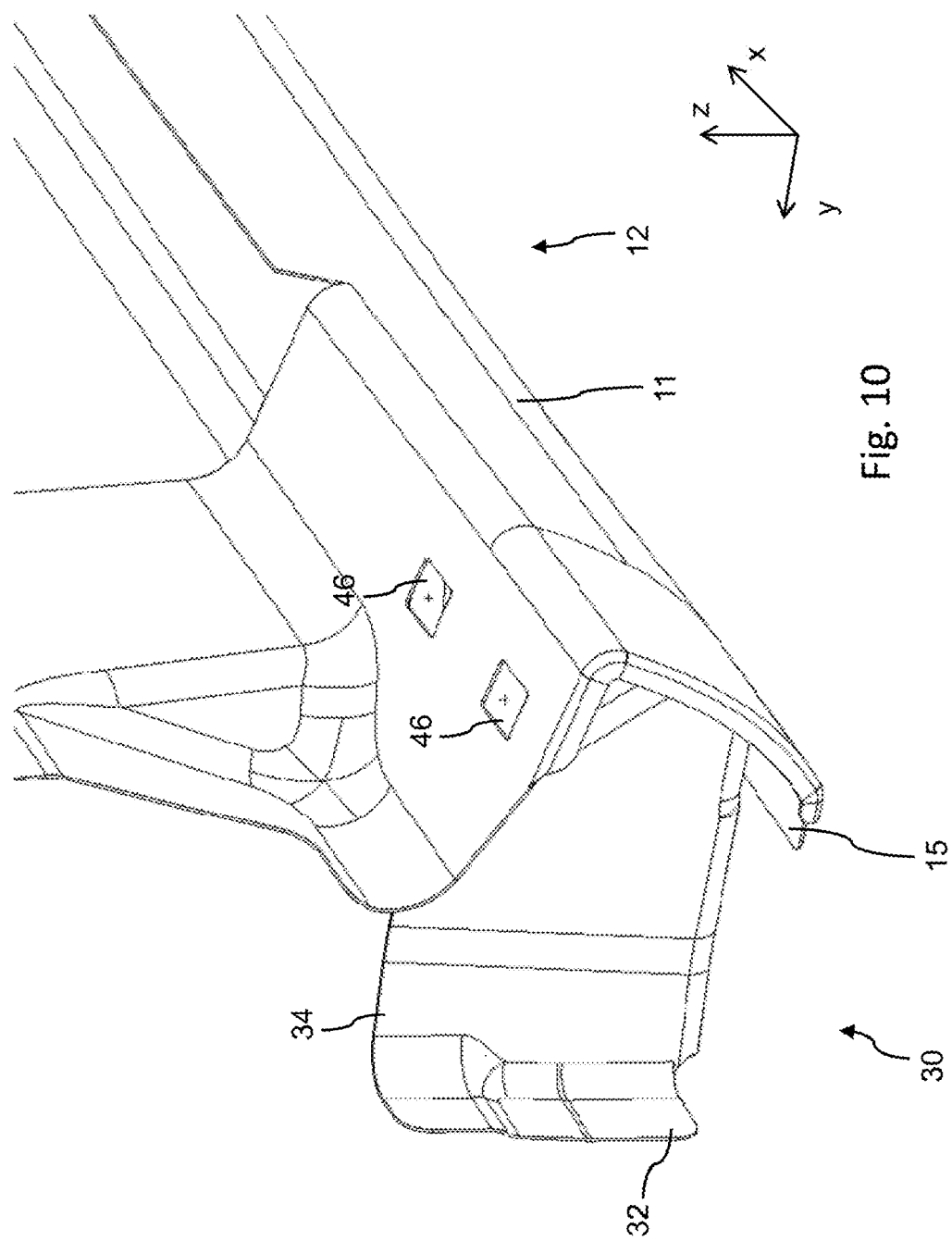
FIG. 10 is a perspective view corresponding to FIG. 1 of a sillboard arrangement with modified end cap and modified lateral wall outside panel.

As further evident from reviewing FIG. 5 and FIG. 10, a front side 34 of the end cap 30 extending essentially in the transverse direction of the vehicle (y) and vertical direction of the vehicle (z) closes off the sillboard hollow profile 48, while a lateral section 39 that is inclined relative thereto and provided with a separate lateral connecting flange 37 is provided for locking the hollow profile 50 formed by the lateral wall outside panel 12. In the cross section on FIG. 7, the lateral flange section 37 inwardly abuts the lateral wall 11 of the lateral wall outside panel 12. The lateral section 39 also extends at an angle relative to the front surface 34 of the end cap 30. FIG. 10 provides two attachment holes 46 that are spaced apart from each other on an inwardly projecting upper side of the lateral wall outside panel 12, and can be used to secure other body components, e.g., a fender, to the lateral wall outside panel 12 and/or the underlying structurally reinforcing end cap 30.

The embodiments only present a possible configuration, and numerous other variants are conceivable and lie within the presented framework. The exemplarily shown exemplary embodiments are in no way to be construed as limiting in terms of the scope, applicability or potential configurations. The summary and description only shows one possible implementation of an exemplary embodiment. A wide variety of modifications can be made to the function and arrangement of described elements, without here departing from the scope of protection defined by the ensuing patent claims or equivalents thereof.

What is claimed is:

1. A sillboard arrangement of a body for a motor vehicle, comprising:
    sillboard outside panel;
    a sillboard inside panel;
    a connecting flange configured to join the sillboard inside panel and the sillboard outside panel, the connecting flange extending in a longitudinal direction of the sillboard arrangement;
    a lateral wall outside panel attached to a bottom side of the sillboard outside panel in an area spaced apart from the connecting flange;
    an end cap secured to the lateral wall outside panel; and
    an end lying in the longitudinal direction of a sillboard profile that comprises a floor section essentially indentation free in relation to a transverse direction of the motor vehicle and spaced apart in a vertical direction of the motor vehicle from a bottom side of the lateral wall outside panel.

2. The sillboard arrangement according to claim 1, wherein the end cap and the lateral wall outside panel are configured such that the end cap is insertable into the sillboard profile of the lateral wall outside panel in a joining direction extending essentially in the transverse direction of the motor vehicle.

3. The sillboard arrangement according to claim 1, wherein a bottom side of the lateral wall outside panel comprises a recess configured to accommodate the end cap.

4. The sillboard arrangement according to claim 1, wherein the end cap with a lower connecting flange abuts the outside of the bottom side of the lateral wall outside panel.

5. The sillboard arrangement according to claim 4, wherein the end cap bordering the lower connecting flange comprises an incline that downwardly projects in the longitudinal direction of the motor vehicle and in the vertical direction of the motor vehicle, and passes over into a floor section.

6. The sillboard arrangement according to claim 5, further comprising a water outlet device integrated into the floor section.

7. The sillboard arrangement according to claim 1, wherein the end cap with a lateral connecting flange abuts the inside of a lateral profile section of the lateral wall outside panel.

8. The sillboard arrangement according to claim 1, wherein the lateral wall outside panel is a bending fabricated component.

9. The sillboard arrangement according to claim 1, wherein the end cap is configured to lock a hollow profile comprised of the sillboard outside panel and the sillboard inside panel.

10. The sillboard arrangement according to claim 1, wherein the end cap is configured to lock a hollow profile comprised of the sillboard outside panel and the lateral wall outside panel.

* * * * *